United States Patent [19]

Green et al.

[11] 4,117,966
[45] Oct. 3, 1978

[54] EXPLOSIVE WELDING OF A TUBE INTO A TUBE SHEET

[75] Inventors: Sheryll C. Green, London; Vonne D. Linse, Columbus, both of Ohio

[73] Assignee: The United States of America as represented by the United States Department of Energy, Washington, D.C.

[21] Appl. No.: 841,614

[22] Filed: Oct. 13, 1977

[51] Int. Cl.$^2$ .............................................. B23K 21/00
[52] U.S. Cl. ................................... 228/2.5; 29/157.4; 29/421 E
[58] Field of Search ................ 228/2.5, 107, 108, 109; 29/157.4, 421 E

[56] References Cited

U.S. PATENT DOCUMENTS

| | | | |
|---|---|---|---|
| 3,409,969 | 11/1968 | Simons et al. | 228/2.5 |
| 3,503,110 | 3/1970 | Berry et al. | 228/108 X |
| 3,790,060 | 2/1974 | Feiss | 228/2.5 |
| 3,912,148 | 10/1975 | Johnson | 228/2.5 |

Primary Examiner—Al Lawrence Smith
Assistant Examiner—K. J. Ramsey
Attorney, Agent, or Firm—Dean E. Carlson; Frank H. Jackson; Hugh W. Glenn

[57] ABSTRACT

A cartridge containing an explosive charge is placed within a tube assembled within a tube sheet. The charge is detonated through use of a detonator cord containing a minimum but effective amount of explosive material. The cord is contained inside a tubular shield throughout most of its length within the cartridge. A small length of the cord extends beyond the tubular shield to contact and detonate the explosive charge in its rear portion near the cartridge base. The cartridge base is provided of substantial mass and thickness in respect to side and front walls of the cartridge to minimize bulging beyond the rear face of the tube sheet. For remote activation an electrically activated detonator of higher charge density than the cord is attached to the cord at a location spaced from the tube sheet, cartridge and tube.

6 Claims, 1 Drawing Figure

U.S. Patent  Oct. 3, 1978  4,117,966
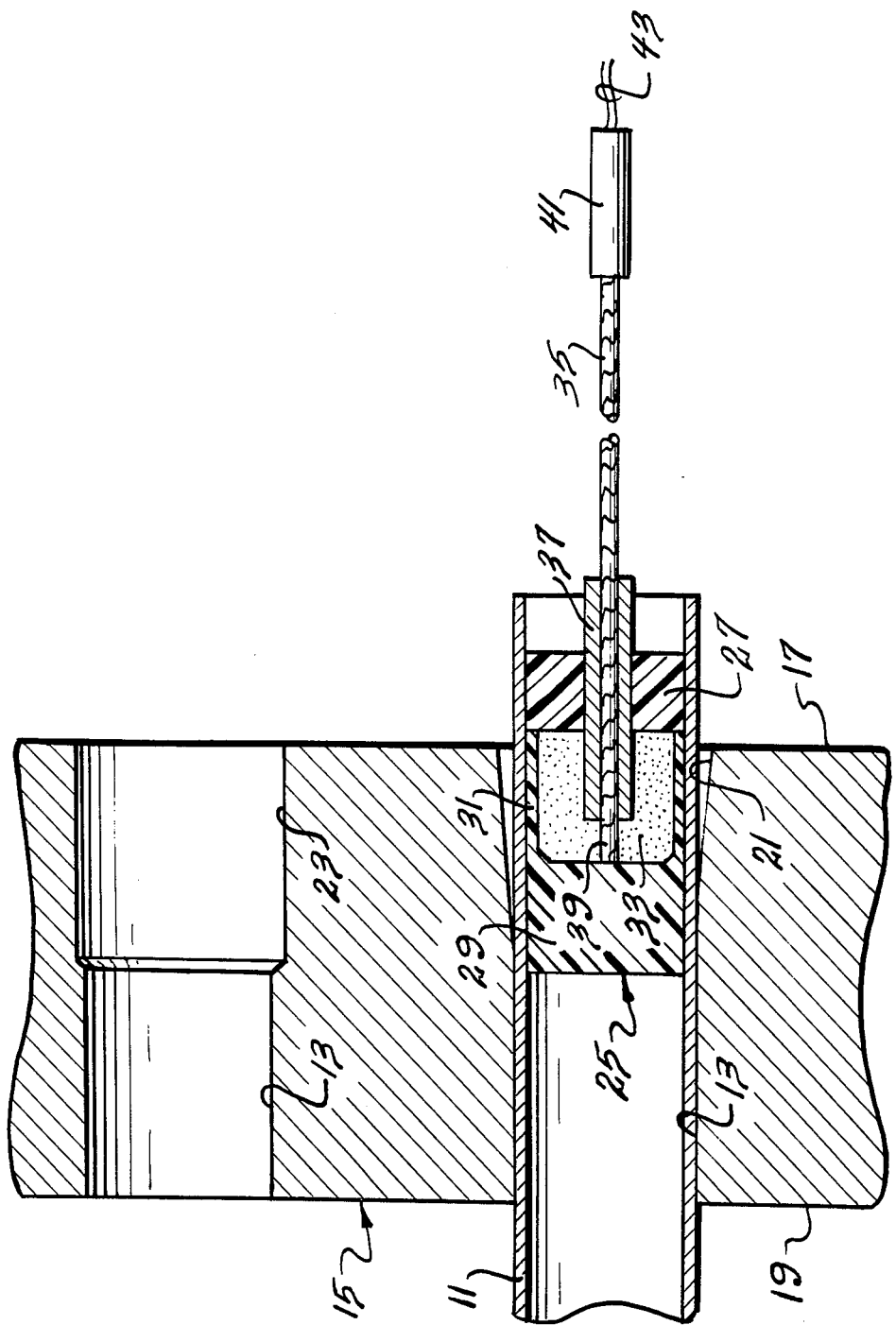

EXPLOSIVE WELDING OF A TUBE INTO A TUBE SHEET

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the explosive welding of tubes into tube sheets. It has particular applicability to the welding or otherwise bonding of aluminum tubes into steel alloy tube sheets. However, the techniques presented herein will also be applicable to other material combinations.

Previous devices for explosive welding of tubes into tube sheets have often included explosive charges placed within the tube near to flush alignment with the front face of the tube sheet. In addition, detonation cords or other means were positioned to contact and initiate detonation at the front face of the explosive charge. This type of arrangement causes the welding to begin at the front tube sheet face and proceed inwardly with possible gas pocket voids or poorly bonded portions of the weld resulting. In addition damage to outwardly facing portions of the tube and tube sheet may also occur. In some devices, blasting caps or detonators arranged near the tube sheet increased the risk of damage from explosion fragments.

In installations involving thin tube sheets, the gases resulting from the explosion can cause bulging and weakening of the tube beyond the rear or internal face of the tube sheet. This can be a substantial problem if sufficient restraints are not provided to prevent early displacement of the explosive cartridge and jetting of explosive gases towards and beyond the rear tube sheet face.

Therefore, in view of these disadvantages of prior art systems, it is an object of the present invention to provide an improved assembly for the explosive welding of tubes into a tube sheet in which the detonation of the explosive charge begins at an internal location and proceeds outwardly.

It is a further object to provide an explosive welding assembly in which bulging of tube portions beyond the rear tube sheet face are minimized.

It is also an object to provide an assembly for welding a tube into a tube sheet in which damage to the front tube and tube sheet faces from explosion fragments are minimized.

SUMMARY OF THE INVENTION

In accordance with the present invention an assembly for the explosive welding of a tube into a tube sheet is provided. The assembly includes, in combination with a tube assembled within a tube sheet opening, a cartridge containing an explosive charge disposed within the tube in overlapping alignment with the front face of the tube sheet. The major portion of the charge is positioned within the tube at a location aligned near to the front face but between the front and back faces of the tube sheet. The cartridge base includes greater thickness and inertial mass than the front or side walls of the cartridge to minimize risk of tube swelling immediately behind the tube sheet. The explosive charge is detonated by a cord containing a sufficient amount of explosive charge for that purpose but yet an insufficient amount to deform the capsule. The cord extends from a location outside the cartridge through most of the explosive charge to the rear portion of the charge such that detonation can begin at the rear and proceed outwardly through the tube. The cord is contained within a tubular shield through most of the explosive charge, but the shield is terminated just prior to the end of the cord to provide a cord portion in intimate contact with the rear portion of the explosive charge.

BRIEF DESCRIPTION OF THE DRAWINGS

The FIGURE is an elevation view in cross section illustrating the present invention as an assembly for welding a tube into a tube sheet.

DETAILED DESCRIPTION OF THE PREFERRED EMBODIEMT

In the FIGURE a tube 11 is shown positioned within an opening 13 through a tube sheet 15 in preparation of welding the tube into the tube sheet. Tube sheet 15 includes a front face 17 facing outwardly near the end of tube 11 and a rear face 19 facing inwardly towards the major portion of tube 11. For instance, in a typical heat exchanger, front face 17 is disposed toward the heat exchanger head and rear face 19 is directed towards the internal shell volume of the heat exchanger.

The outside diameter of tube 11, as shown, corresponds fairly closely with the inside diameter of opening 13. However, to facilitate welding, the opening 13 can include a tapered portion 21 or a stepped portion 23 of increased diameter towards the front face 17 of the tube sheet.

A cartridge 25 of a plastic such as an acrylic resin or other deformable material is positioned within tube 11 at a location which overlaps in alignment with the front face 17 of tube sheet 15. To facilitate its use and further employment, the cartridge is preferably sized to be a close but sliding fit within tube 11. Cartridge 25 includes a front end wall 27, a rear end wall or base 29, and deformable side walls 31. The volume defined between the front 27, base 29 and side walls 31 contains an explosive charge 33. The front wall 27 can be removable for filling and assembling the cartridge.

The major portion of charge 33, that is more than half, is positioned between front face 17 and rear face 19 of tube sheet 15. However, charge 33 is advantageously aligned near to or overlapping with front face 17. Where openings of increased diameter through the tube sheet are employed, such as tapered opening 21 or stepped opening 23, explosive charge 33 is aligned in approximate correspondence with these portions of increased diameter as shown.

A cord 35 containing a small quantity of explosive material throughout its length extends from a location outside cartridge 25 to a location near the rear portion of explosive charge 33. The cord portion passing through the cartridge front wall 27 and most of the explosive charge is contained within a tubular shield 37 which terminates within explosive charge 33 near the rear portion adjacent to base 29. This leaves a minor portion 39 of the cord length within the cartridge 11 exposed to the explosive charge 33. Cord portion 39 is preferably positioned within the rear center portion of charge 33 adjacent to base 29 and is of sufficient length to initiate detonation when activated.

At the opposite end of cord 35 a detonator 41 is connected to cord 35 at a location sufficiently removed from tube sheet 15 and tube 11 to prevent damage to these components from detonator fragments. Electrical conductors 43 are illustrated as one means of activating detonator 41 and cord 35.

In order to employ the above described assembly in the explosive welding of tube 11 into tube sheet 15, detonator 41 is activated and the resulting detonation propagated along the explosive cord 35 into explosive charge 33 within cartridge 25. The amount of explosive charge provided in cord 35 is an amount sufficient to initiate the detonation of explosive charge 33 at cord portion 39 but yet an insufficient amount to rupture or severely deform tubular shield 37. Consequently, the charge in cord 35 is also insufficient to noticeably disturb the explosive charge 33 and deform side walls 31 of cartridge 25. This amount of charge within cord 35 can be conveniently determined by one skilled in the art having in mind the size and wall thicknesses of cartridge 25 and tubular shield 37. If necessary, empirical techniques could be employed for this purpose.

Since detonation of cord 35 is contained within shield 37, explosive charge 33 is initiated at its rear portion adjacent to base 29. The explosion then proceeds forward towards front face 17 while explosively impinging side wall 31 and tube 11 with sufficient impact into the wall of opening 13 within tube sheet 15 to effect explosive welding of the tube 11 to the tube sheet 15. Charge 33 is provided in sufficient amount to effect such welding by taking into account the size, thickness and strength of the walls of tube 11. Merely by way of example, appropriate amounts of TNT, PETN, combinations of these or other explosives capable of providing sufficient detonation velocities can be used to weld metal tubes of about 1-8 cm diameter, 0.05-0.5 cm wall thickness into suitably sized tube sheet openings.

Rear wall or base 29 of cartridge 25 is provided of sufficient inertial mass and thickness as well as sufficient length and surface in contact with the inner walls of tube 11 to prevent explosive gases or early displacement of the cartridge from bulging the walls of tube 11 beyond the rear surface 19 of tube sheet 15. To accomplish this purpose, base 29 will be of greater mass and thickness than the front wall 27.

An explosvie welding assembly, as thus described, is well suited for the explosive welding of metal tubes into metal tube sheets.

This assembly, particularly in combination with a tapered or stepped opening as illustrated at 21 and 23 in the drawing, will advantageously begin welding at an internal circumference of the tube sheet opening and proceed outwardly to expel the expanding and erosive gases at the front tube sheet face. This reduces the risk of gas pockets and nonbonded regions remaining within the completed weld. Therefore by minimizing the possibilities of weld faults occurring, hard-to-weld combinations such as aluminum tubes into steel alloy tube sheets are advantageously bonded together through use of the assembly described herein.

It will therefore be clear that the present invention provides an improved assembly for the explosive welding of tubes into tube sheets. The assembly minimizes the possibility of external damage from explosion fragments that may occur to the tube sheets and external tube portions. It also helps to prevent internal tube bulging or rupture within the tube-bundle shell beyond the internal tube sheet face.

The embodiments of the invention in which an exclusive property or privilege is claimed are defined as follows:

1. An assembly for the explosive welding of a metal tube within an opening of a metal tube sheet having a front face aligned near one end of said tube and a rear face towards the major portion of the tube length, said assembly comprising in combination with said tube positioned within said tube sheet opening:

a cartridge including a base, side walls and front wall, containing an explosive charge, said cartridge disposed within said tube in overlapping alignment with the front face of said tube sheet, the major portion of said charge being positioned in near alignment with the front face, but between said front and rear faces of said tube sheet, said cartridge base being of greater mass and greater thickness than the opposing front wall and being located between said charge and the rear face of said tube sheet to minimize explosive bulging of said tube beyond said rear tube sheet face;

a cord containing explosive material sufficient to transmit detonation to said explosive charge, said cord extending from outside said cartridge through said front wall and through said explosive charge to the rear portion of said charge adjacent to said cartridge base; and a tubular shield encompassing said cord from a location outside said cartridge to a location within the rear portion of said explosvie charge but short of the end of said cord to expose said cord end to said explosive charge.

2. The assembly of claim 1 wherein there is included an electrically activated detonator communicating with said cord at a location outside and spaced from said tube sheet, tube and cartridge, to detonate said cord with limited splatter and shock to said tube sheet, tube and cartridge.

3. The assembly of claim 1 wherein the end portion of said cord is in intimate engagement with the rear portion of said explosive charge within said cartridge and said tubular shield substantially excludes contact between said cord and explosive charge throughout the contained length of said cord to initiate detonation of said explosive charge within its rear portion adjacent to said cartridge base.

4. The assembly of claim 1 wherein said tube comprises aluminum and said tube sheet comprises steel alloy.

5. The assembly of claim 1 wherein said cartridge having an outside diameter closely fitted into the inside diameter of said tube.

6. The assembly of claim 1 wherein said tube sheet having an opening of larger diameter for accepting said tube at said front face than at said back face thereof.

* * * * *